F. F. FIREBAUGH.
COTTON CHOPPER.
APPLICATION FILED SEPT. 15, 1910.
988,450.
Patented Apr. 4, 1911.
2 SHEETS—SHEET 2.
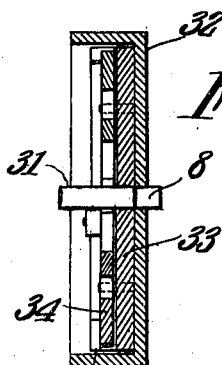
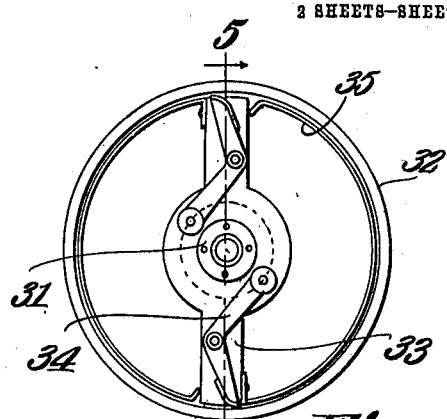
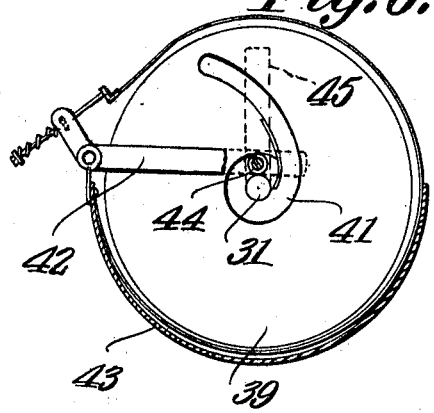
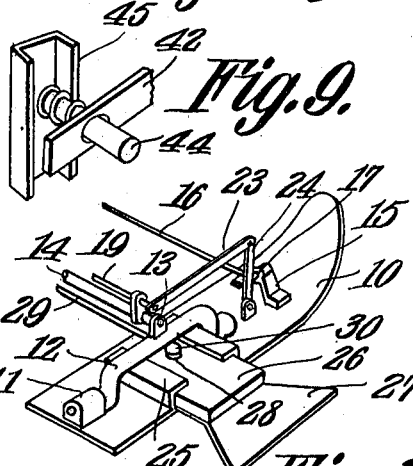
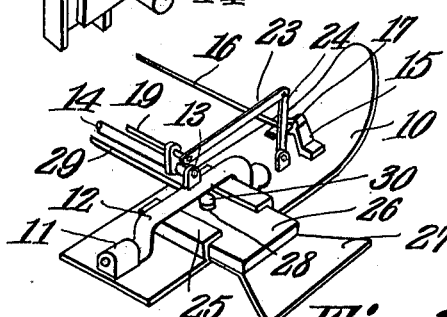
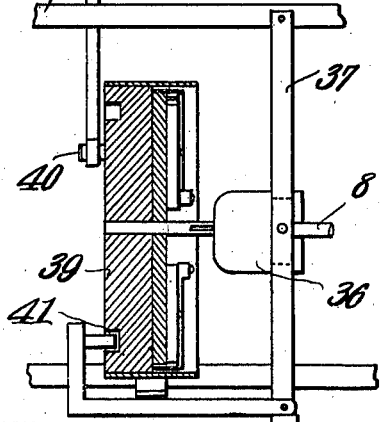
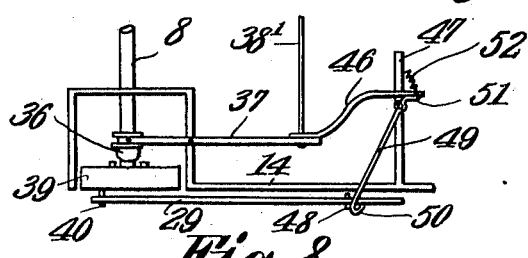
Witnesses
Frank B. Woodin
M. E. Tracy
Fred F. Firebaugh,
Inventor
by C. A. Snow & Co.
Attorneys.

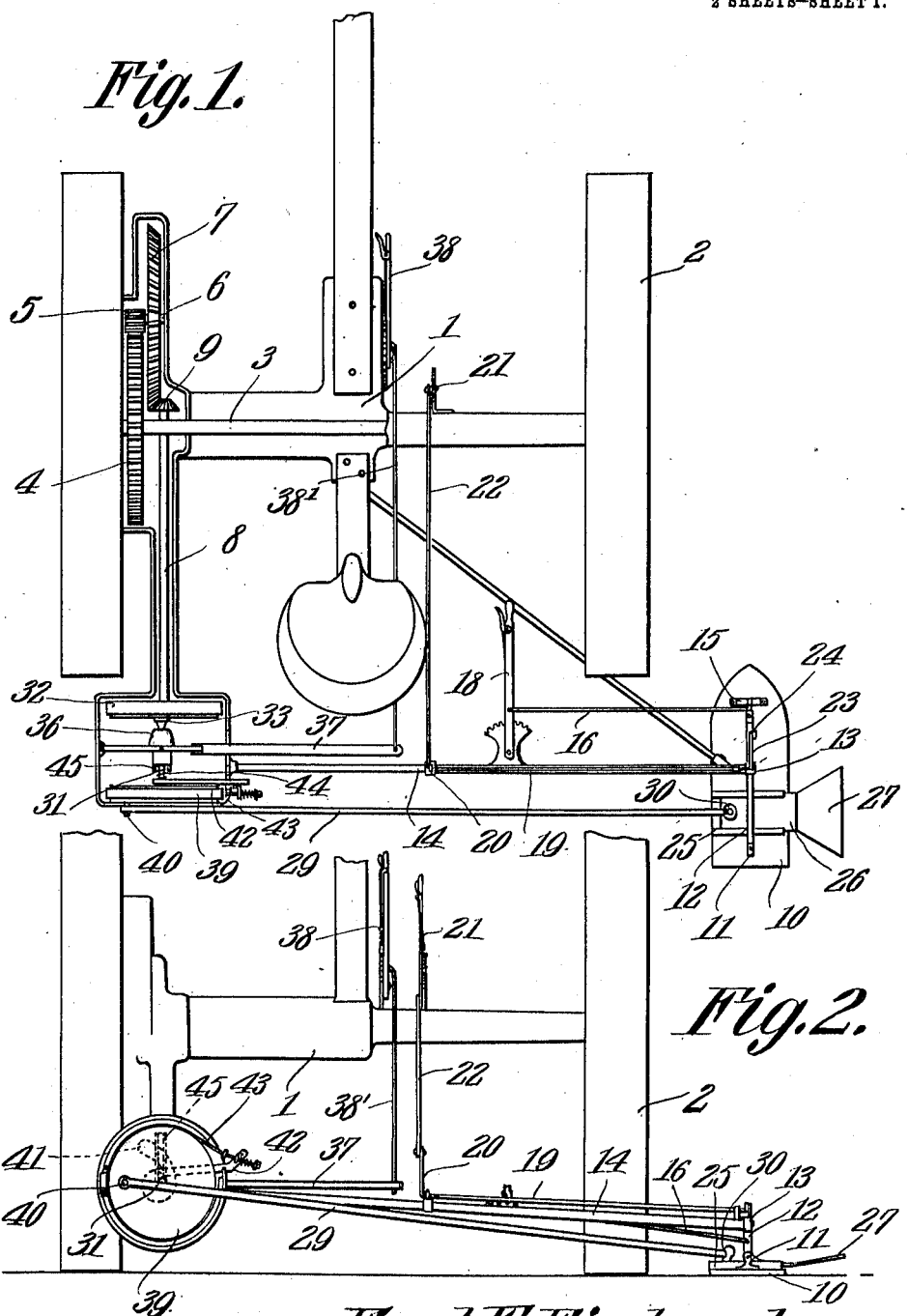

UNITED STATES PATENT OFFICE.

FRED FERN FIREBAUGH, OF GRACEMONT, OKLAHOMA.

COTTON-CHOPPER.

988,450.  Specification of Letters Patent.  Patented Apr. 4, 1911.

Application filed September 15, 1910. Serial No. 582,209.

*To all whom it may concern:*

Be it known that I, FRED FERN FIREBAUGH, a citizen of the United States, residing at Gracemont, in the county of Caddo and State of Oklahoma, have invented a new and useful Cotton-Chopper, of which the following is a specification.

This invention has relation to a cotton chopper of the selective type and consists in the novel construction as hereinafter shown, described and claimed.

The object of the invention is to provide a simple cotton chopper of the kind mentioned which may be moved along the side of a row of standing plants and which will automatically operate to chop out undesired plants.

When the chopper arrives at plants which it is desired to preserve the operation of the chopper is manually interrupted whereby the desired plant is left standing in the row. Several means may be provided for effecting the interruption of the operation of the chopper and some of these means are hereinafter shown and described.

In the accompanying drawings: Figure 1 is a top plan view of one form of the cotton chopper. Fig. 2 is a rear elevation of the same. Fig. 3 is a perspective view of the chopping mechanism. Fig. 4 is a side elevation of part of one form of friction device that may be used upon the chopper. Fig. 5 is a transverse sectional view of said part of friction device. Fig. 6 is a side elevation of another part of the friction device that may be used. Fig. 7 is a sectional view of a modified form of friction device that may be used upon the chopper. Fig. 8 is a plan view of a modified form of means for holding the chopping blade in retracted position when not in operation. Fig. 9 is a perspective view of a guide and pin which are parts of one form of the chopper.

The cotton chopper includes a frame 1 which has much of the resemblance of an ordinary mower frame and which is supported upon traction wheels 2. The axle shaft 3 is provided with a gear wheel 4 which meshes with a gear wheel 5 fixed to an arbor 6. The said arbor 6 is journaled in the frame 1 and is provided with a bevel gear wheel 7. A shaft 8 is journaled upon the frame 1 and extends at right angles to the axle 3 and is provided at its forward end with a bevel gear wheel 9 which meshes with the gear wheel 7.

Passing from the description of the general structure of the frame of the chopper, a description will now be given of the chopping mechanism.

The chopping mechanism includes a shoe 10 having a pointed forward end which is curved in an upward direction. Eyes 11 are fixed to the rear portion of the shoe 10 and upon the upper side thereof and the ends of a yoke 12 are journaled in the said eyes. The yoke 12 is provided at a point intermediate its ends with an eye 13 in which is journaled the outer end of an arm 14. The arm 14 at its inner end is pivotally connected with the frame 1 of the chopper. The axis of the pivotal connection between the arm 14 and yoke 12 is at a right angle to the axis of the pivotal connection between the said yoke and the eyes 11.

A standard 15 is mounted upon the intermediate portion of the shoe 10 and upon the upper side thereof and a rod 16 is provided at one end with a pin 17 which is journaled in the said standard 15. The pin 17 extends at a right angle to the rod 16, said rod 16 at its inner end is pivotally connected to a lever 18 which is fulcrumed upon the arm 14. By swinging the lever 18 and moving the rod 16 longitudinally, the shoe 10 may be turned upon the axis of the pivotal connection between the yoke 12 and eyes 11. A shaft 19 is journaled upon the arm 14 and is provided at one end with a crank 20 which is operatively connected with a lever 21, mounted upon the frame 1, by means of a rod 22. The shaft 19 is provided at its outer end with a crank arm 23 which is operatively connected with the forward portion of the runner 10 by means of a rod 24. By this arrangement it will be seen that by swinging the lever 21 and moving the rod 22 longitudinally, the shaft 19 is rocked and through the arm 23 and rod 24 the forward portion of the shoe 10 may be raised or lowered which movement occurs upon the axis of the pivotal connection between the yoke 12 and the arm 14.

Guides 25 are mounted upon the runner 10 under the yoke 12 and extend transversely across the said runner. A plate 26 is slidably mounted between the said guides 25 and at its outer end portion supports a chopping blade 27. A knob or ball 28 is mounted upon the rear portion of the plate 26 and a pitman rod 29 is provided at its outer end with a socket 30 which receives said knob or ball 28 forming a universal joint.

Means are provided for operating the pitman rod 29 from the shaft 8 and in connection with this means a lever mechanism is provided for throwing the said means in and out of gear and at the same time operate or release a band brake mechanism to cause the pitman 29 to come to a state of rest when the plate 26 is drawn to the limit of its retracted position within the guides 25.

A shaft 31 is journaled in longitudinal alinement with the shaft 8 and the shaft 8 is provided at its end portion adjacent the shaft 31 with a friction disk 32. An arm 33 is fixed to the shaft 31 and levers 34 are fulcrumed to the said arm 33. Friction bands 35 are connected at one end to the extremities of the arm 33 and the other ends of the said friction bands are engageable by the outer ends of the levers 34. A conical clutch member 36 is slidably mounted upon the shaft 31 and when moved so that its conical end is projected between the inner ends of the levers 34, the said levers are swung upon their fulcrums whereby the friction bands 35 are caused to frictionally engage the disk 32. A lever 37 is fulcrumed upon the frame 1 and engages the clutch member 36. A lever 38 is fulcrumed upon the frame 1 and the said lever is operatively connected with the end of the lever 37 by means of a rod 38'. A disk 39 is fixed to the shaft 31 and is provided with a wrist pin 40 to which the inner end of the pitman rod 29 is journaled. The disk 39 is provided upon one side with a cam groove 41. A lever 42 is fulcrumed upon the frame 1 and a friction band 43 is connected at its ends with the said lever and lies around the periphery of the disk 39. A spring pressed pin 44 passes transversely through the lever 42 and lies in the cam groove 41. A guide 45 is loosely journaled upon the shaft 31 and retains the outer end portion of the spring pressed pin 44. The guide 45 is arranged to slide at the end of the clutch member 36 and in unison with the same. Thus when the lever 37 is moved the clutch member 36 is moved toward or away from the levers 34. When the said clutch member is moved toward the said levers, the inner ends of the said levers are spread, whereby the disk 32 rotates the shaft 31 in unison with the same. When the clutch member 36 is moved toward the arm 33, the guide 45 pulls the end of the spring pressed pin 44 out of the cam groove 41. When the clutch member 36 is moved in the opposite direction the said clutch member is withdrawn from between the ends of the levers 34 and consequently the shaft 31 comes to a state of rest. At the same time the guide 45 projects the end portion of the spring pressed pin 44 into the cam groove 41 and as the said disk 39 has a tendency to continue rotation under the momentum gained the groove 41 carries the pin away from the center of the shaft 31 and consequently the lever 42 is swung upon its fulcrum which in turn binds the friction band 43 about the periphery of the disk 39. Thus the disk 39 and its attachments are brought to a state of rest by friction means. In Figs. 1, 2, 4, 5 and 6 the disks 32 and 39 are shown separated but it will be understood that these disks may be combined in one as illustrated in Figs. 7 and 8 of the drawings. The wrist pin 40 upon the disk 39 is so positioned with relation to the cam groove 41 that when the disk 39 comes to a state of rest the pitman rod 29 is moved to such an extent that the plate 26 is retracted to the farthest extent within the guides 25 upon the runner 10.

Another modified form of the invention is illustrated in Fig. 8 of the drawing in which an arm 46 is attached to the end of the lever 37. A forwardly disposed arm 47 is fixed to the intermediate portion of the arm 14 and the pitman 29 is provided with a cross pin 48 the end portions of which project beyond the opposite sides of the said pitman. A lever 49 is fulcrumed upon the arm 47 and is provided at its rear end with a loop 50 which receives the intermediate portion of the pitman 29 and which at times is adapted to engage the projecting end portions of the pin 48. At its forward ends the lever 49 is provided with an upstanding extremity 51 which is located in the path of movement of the arm 46. A coiled spring 52 is connected at one end to the forward portion of the arm 47 and at its rear end to a lever 49 at or in the vicinity of the upstanding extremity 51 thereof. The spring 52 is under tension with a tendency to draw the upstanding portion 51 of the lever 49 in a forward direction. Consequently when the lever 36 is moved in a rearward direction the end portion of the arm 47 strikes the upstanding extremity 51 of the lever 49 and rocks the said lever upon its fulcrum whereby the loop 50 is carried toward the pin 48 mounted upon the pitman 29. When the lever 37 is moved as indicated the disk 39 is thrown out of gear with the adjacent operating part and the loop 50 comes in contact with the projecting end portion of the pin 48 and moves the pitman 29 so that the plate 26 is retracted to the fullest extent in an inward direction between the guides 25 and in held in this position until thei lever 36 is moved in a forward direction and the loop 50 of the lever 49 is moved away from the pin 48 upon the pitman 29 in response to the traction exercised by the spring 52. By this arrangement it will be seen that means are provided for chopping out undesirable plants in a row of plants, and when the machine arrives adjacent a plant which should be left standing in the row, the operator manipulates the lever 37 and its attachment whereby the chopping operation of the machine is momentarily interrupted and at the same time the chopping blade is held at the limit of its retractive stroke, while the desired plant is passed. After this the operator manipulates the lever 37 so that the chopping operation of the device is continued.

Having described the invention what I claim as new and desire to secure by Letters Patent is:

1. A cotton chopper comprising a wheel mounted frame, an arm attached to the frame, a yoke pivotally mounted upon said arm, a runner pivotally connected to the yoke to swing in a direction at right angles to the direction in which the yoke may swing upon the arm, guides mounted upon the runner and a chopping device mounted for reciprocation between the guides and means for operating the chopping device.

2. A cotton chopper comprising a wheel mounted frame, an arm attached to the frame, a yoke pivotally mounted upon the arm, a runner pivotally connected with the yoke and arranged to swing at a right angle to the direction in which the yoke may swing upon the arm, guides mounted upon the runner, a reciprocatory chopping element mounted for movement between the guides, means for reciprocating said chopping element, and means for interrupting the reciprocatory movement of the chopping element at the extremity of the retractive stroke thereof.

3. A cotton chopper comprising a wheel mounted frame, an arm attached to the frame, a yoke pivotally mounted upon the arm, a runner pivotally connected with the yoke, means for swinging the runner with relation to the yoke and the arm, guides mounted upon the runner, a chopper mounted for reciprocation between the guides, means for operating the chopper, and means for interrupting the operation of the chopper at the limit of its retractive stroke.

In testimony that I claim the foregoing as my own, I have hereto affixed my signature in the presence of two witnesses.

FRED FERN FIREBAUGH.

Witnesses:
H. Z. Cook,
F. R. Harp.

---

Copies of this patent may be obtained for five cents each, by addressing the "Commissioner of Patents, Washington, D. C."